United States Patent [19]
Topper

[11] Patent Number: 5,642,483
[45] Date of Patent: Jun. 24, 1997

[54] METHOD FOR EFFICIENTLY BROADCAST MESSAGES TO ALL CONCERNED USERS BY LIMITING THE NUMBER OF MESSAGES THAT CAN BE SENT AT ONE TIME

[75] Inventor: Jeffrey Topper, Tokyo, Japan

[73] Assignee: NEC Corporation, Tokyo, Japan

[21] Appl. No.: 281,118

[22] Filed: Jul. 28, 1994

[30] Foreign Application Priority Data

Jul. 30, 1993 [JP] Japan .................................. 5-190273

[51] Int. Cl.$^6$ .............................. G06F 13/00; G06F 13/14
[52] U.S. Cl. ................. 395/200.13; 395/849; 395/854; 395/865; 395/879; 364/166; 364/222.2; 364/232.22; 364/242.94; 364/939.4; 364/941.5
[58] Field of Search ........................ 370/60.1; 395/280, 395/200.13, 849, 854, 865, 879; 364/166

[56] References Cited

U.S. PATENT DOCUMENTS 4,918,687  4/1990  Bustini et al. .......................... 370/60.1
5,408,619  4/1995  Oran .......................................... 395/280

FOREIGN PATENT DOCUMENTS 2-230363  9/1990  Japan.

OTHER PUBLICATIONS

"Poll Actuated Multiple Access Technique for Broadgathering Systems", IBM Technical Disclosure Bulletin, vol. 30, pp. 72–78.

Primary Examiner—Thomas C. Lee
Assistant Examiner—Po C. Huang
Attorney, Agent, or Firm—Foley & Lardner

[57] ABSTRACT

A rate-limited user status broadcast method consists of a broadcast registration procedure and a broadcast procedure and makes use of a database including a user information data table for storing the current status of each user, a broadcast registration table for holding the current registration status of each user for which service is provided, and a destination list containing all concerned destinations for each user. In the broadcast registration procedure, a user is registered to be the subject of a broadcast procedure, and if there has been a change in the user's status, the user's status information is updated. In the periodically activated broadcast procedure, the status changes of registered users are sent to destinations associated with each user.

5 Claims, 5 Drawing Sheets

METHOD FOR EFFICIENTLY BROADCAST MESSAGES TO ALL CONCERNED USERS BY LIMITING THE NUMBER OF MESSAGES THAT CAN BE SENT AT ONE TIME

BACKGROUND OF THE INVENTION

1. Field of the Invention

The present invention relates to a data communication network, and particularly to a broadcast method in a data communication network for broadcasting changes in status of network users to concerned destinations within the network when such changes occured.

2. Description of the Related Art

An example of this type of broadcast method of status change by each user's processor in a data communication network is disclosed in, for example, Japanese Patent Application Laid-open No. 230363/90 (filed Sep. 12, 1994). Here, each of the processors connected to a common transmission medium detects status changes of each I/O device, and transmits and receives configuration information indicating each I/O status by way of the common transmission medium, thereby performing mutual diagnosis of I/O status. A transmission medium control device (Network Control Processor) performs control when the connected processor transmits and receives data by way of the common transmission medium. When a processor is activated, the processor detects I/O status changes that it monitors, (it detects values differing from initial values previously stored in nonvolatile memory), and broadcasts its own configuration information by way of the common transmission medium. In this way, each user can detect mutual configuration information even at the time of system reconfiguration due to recovery of the processor or NCP.

The above-described broadcast method of the prior art broadcasts each change in user status event completely, notifying each concerned destination associated with the user until each has been notified. New notification of subsequent changes in user status are held in a FIFO queue as long as resources are available for use, and if there is not sufficient resources for holding these changes in user status information, new information may be lost. In addition, since user status may change during the period from the time the broadcast decision is made until the time broadcast begins, invalid information may be proliferated in the network. In other words, when broadcast registration and broadcast processing are executed sequentially and without suspension, because notification of subsequent changes in user status will be left at the end of the FIFO queue, the impact of new information will not be reflected in the broadcast processing underway or in processes which have been previously enqueued.

Another problem is that changes in user status often occur in groups rather than evenly. This phenomenon raises the two problems that, when a large number of changes in user status occur at the same time, the broadcast process will monopolize the resources at the originating destination, interfering with the performance of other normal functions, and the sudden increase in broadcast messages will cause network congestion.

SUMMARY OF THE INVENTION

The object of the present invention is to provide a rate-limited user status broadcast method that transmits the most recent and accurate user information to the concerned destinations of a large number of registered users requiring the information, without placing an excessive burden on the capacity of the network.

The user status broadcast method of the present invention operates by limiting the number of sent notification messages processed during any given time period in order to solve the problem of congestion for each user and the transmission network. Broadcast registration and broadcast message sending are handled by separate tasks. When the number of messages sent during a broadcast procedure reaches the maximum limit for the above-described given time period, the sending process of notification messages is suspended for a period of time longer than the given time period. When the suspension period expires, the broadcast procedure resumes. Thus, the maximum number of messages divided by the suspension period provides the rate of sending. The rate of sending can be adjusted by varying the suspension period or the maximum number of messages.

The problem of broadcasting the correct user status can be solved by using the user status at the time the user status notification message is sent rather than the time at which the user was registered for broadcast. The broadcast message sending process reads the user status for the user to be processed at the time the user entry is removed from the registration table. This user status is included in each notification until an entry is completely processed, or until the broadcast process is resumed after having been suspended. Since the broadcast registration process is carried out even during suspension of broadcast, the current user status of the user entry that is currently being broadcast may change. Therefore, the user status being processed when the suspension ends is compared with the current user status. If there is no change in status, broadcast of the current entry resumes from the point broadcast was suspended. However, if a change has occurred, processing of the current user is cancelled and processing of the next user in the broadcast registration table begins.

If the status of the current user has changed during a suspension, that user is registered by the broadcast registration procedure and becomes the subject of the next cycle of the broadcast procedure.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENT

The present invention will next be explained with reference to the accompanying figures.

Figure 1:
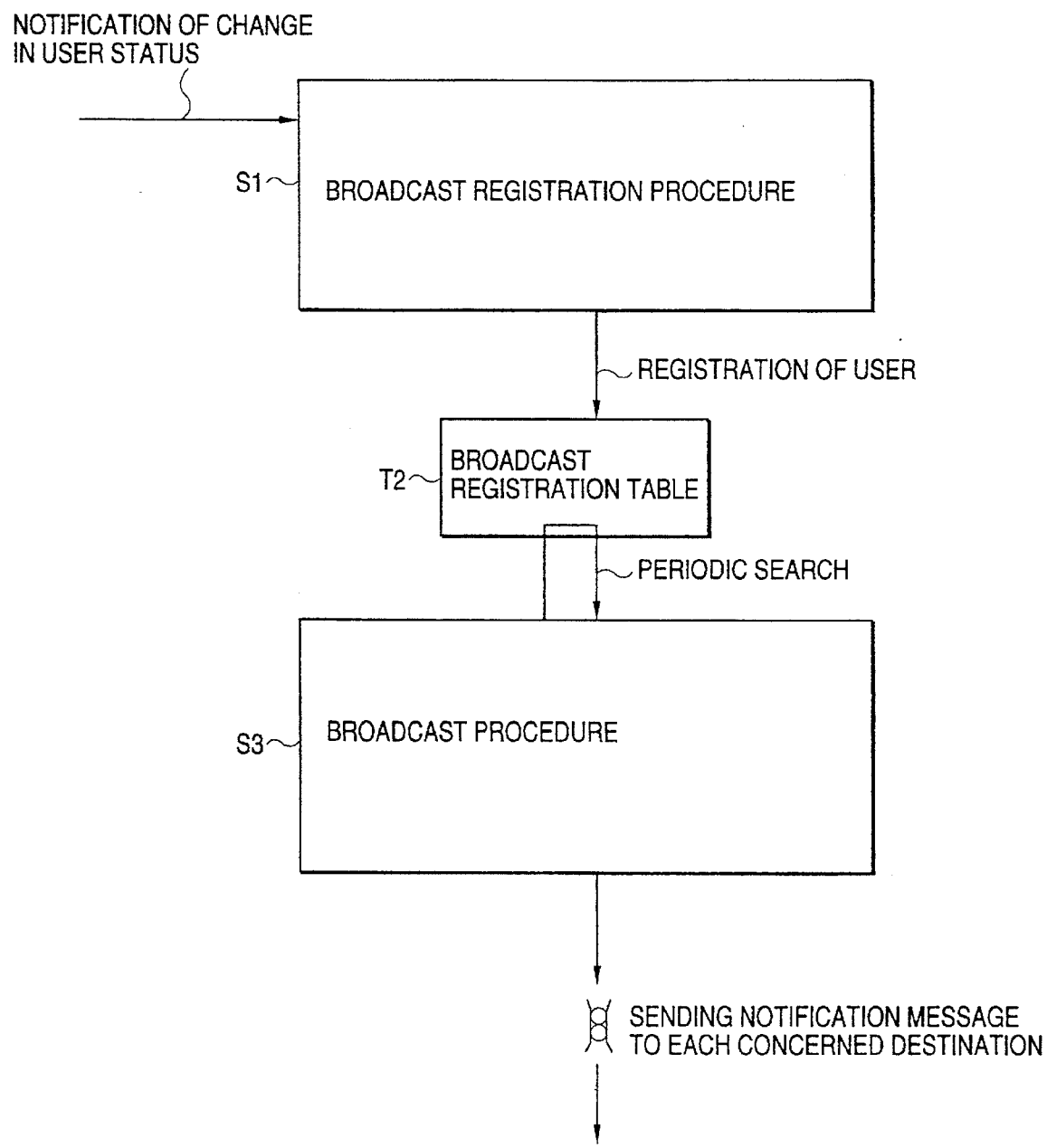
FIG. 1 is a block diagram showing the structure of an embodiment of the rate-limited user status broadcast method of the present invention.

In the Broadcast Registration Procedure S1 shown in FIG. 1, notification of a change in user status is received, the new user status is written to a database, and the user is registered to the Broadcast Registration Table T2. The Broadcast Registration Table T2 contains the list of users for which the Broadcast Procedure S3 is to be performed. In the Broadcast Procedure S3, the entries registered in the Broadcast Registration Table T2 are processed and each concerned destination for each processed entry user is notified of the change in the user's status.

Figure 2:
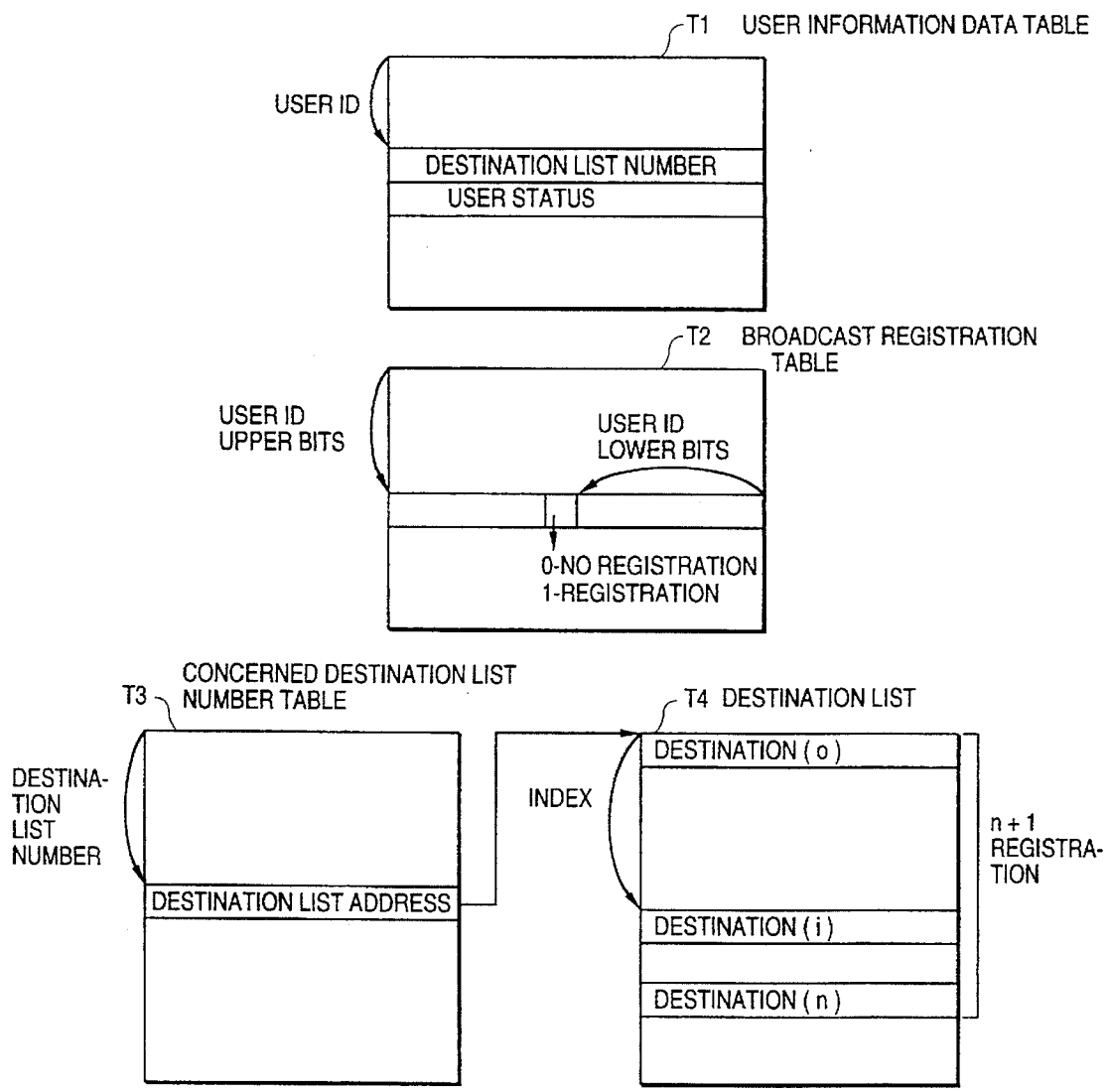
FIG. 2 is a structural view of the database of the embodiment of FIG. 1.

In FIG. 2 showing the structure of the database used in the present invention, the User Information Data Table T1 is indexed by user ID and contains the user's current status and destination address numbers of a destination list associated with the user. A user ID is designated for each network user for which broadcast service of user status is provided, and this user ID is an index for facilitating the storage and retrieval of data about that user. The Destination List T4 is a list of all concerned destinations which are to be notified of changes in user status by the broadcasting user. The Broadcast Registration Table T2 is a bit map indexed by user ID and is used to hold the broadcast registration status of each user. The Concerned Destination List Number Table T3 is a table indexed by Destination List Number and contains the addresses of the Destination List T4 corresponding to the Destination List Number. The Destination List T4 is a table listing the concerned destinations for each user. When the broadcast function is activated for a given user, the updated new user status is sent to each destination noted in a Destination List T4 registered corresponding to that user in the User Information Data Table T1.

Figure 3:
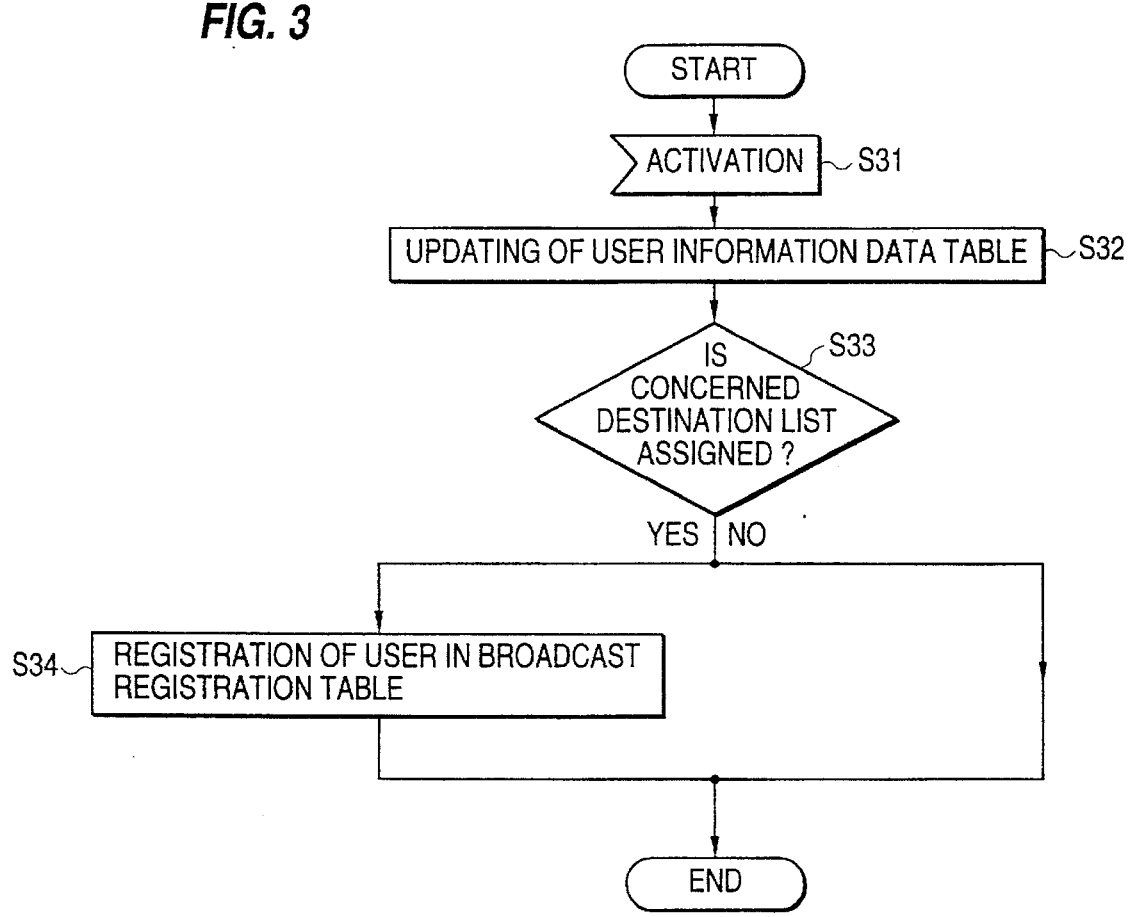
FIG. 3 is a flowchart of the broadcast registration procedure of the embodiment of FIG. 1.

FIG. 3 is a flowchart illustrating the Broadcast Registration Procedure S1. In the following description, S-numbers enclosed in parentheses refer to step numbers.

When notification of a change in user status is received, the Broadcast Registration Procedure S1 is activated (S31), and the user status in the User Information Data Table T1 is updated (S32). In the Broadcast Registration Procedure S1, the User Information Data Table T1 is read to determine if a concerned Destination List T4 is assigned to this user (S33), and if a concerned data list is assigned to the user, the user is registered for broadcast treatment by marking the user as registered in the Broadcast Registration Table T2 (S34). If it is found that no concerned data list is assigned to the user, the procedure ends at that point.

Figure 4:
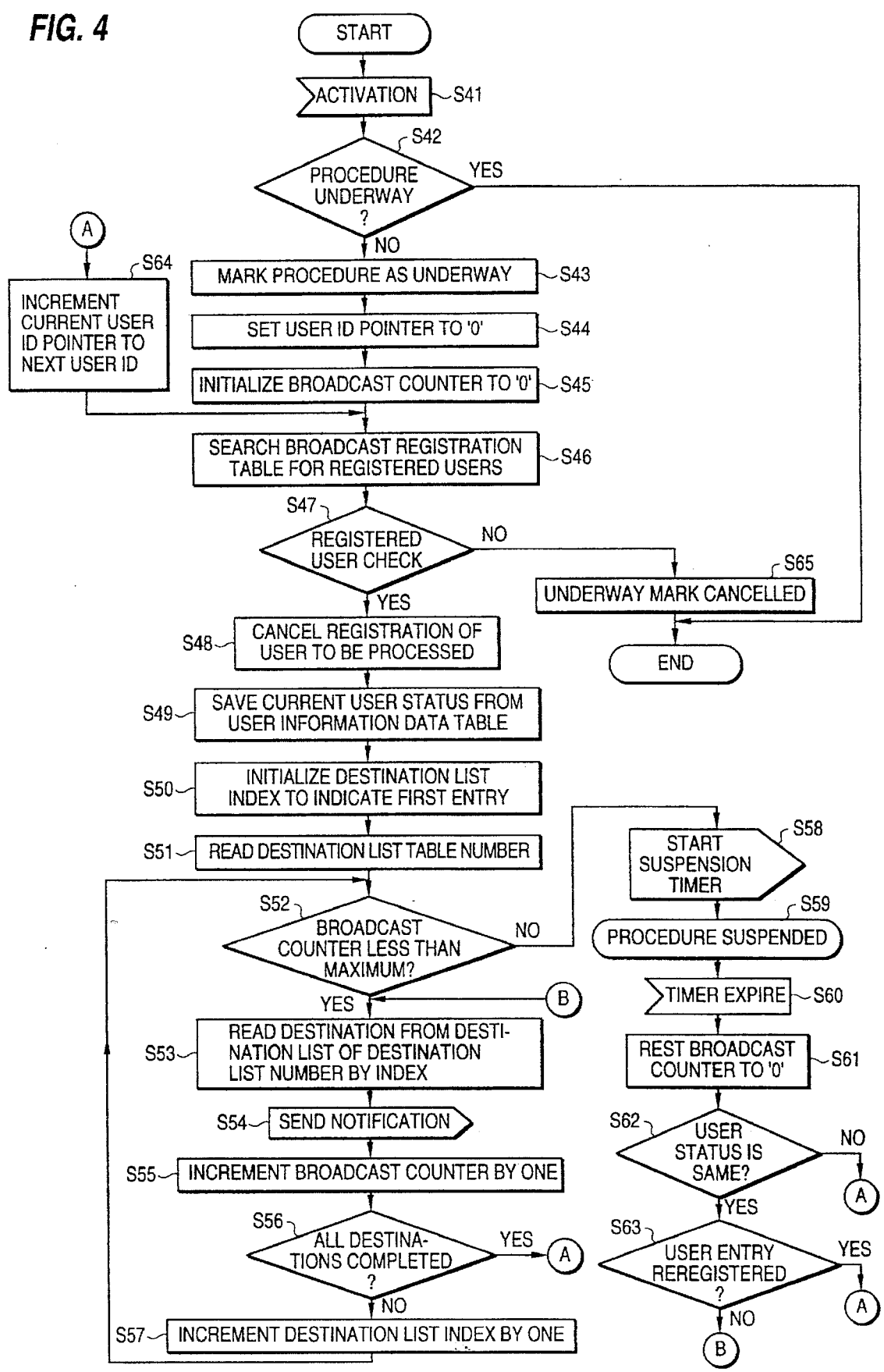
FIG. 4 is a flowchart of the broadcast procedure of the embodiment of FIG. 1.

FIG. 4 is a flowchart illustrating the Broadcast Procedure S3. The Broadcast Procedure S3 is activated periodically (S41) and quits if a broadcast is currently underway. If the broadcast is not currently underway, the Broadcast Procedure S3 is executed (S42).

To facilitate the operation of the Broadcast Procedure S3, several of internal variables are defined. The broadcast processing "Underway" mark is for preventing, while a process invoked in a previous period is suspended, reactivation of the same process. The "Current User" internal variable is set to the user ID of the user currently undergoing broadcast treatment. The "Broadcast Status" variable indicates the user status of the current user to undergo broadcast treatment. The "Destination List Index" indicates the position to be processed next in the current Destination List. The "Destination List Number" indicates the current Destination List. The "Broadcast Counter" maintains the number of notifications during a single uninterrupted processing period. The "Broadcast Counter Maximum" is a fixed value that determines the maximum number of notifications that can be sent during a procedure without undergoing a suspension for a certain time period.

When the Broadcast Procedure S3 is executed, the Broadcast Procedure S3 is marked "Underway" (S43), "Current User" is set to indicate the top of the Broadcast Registration Table T2 (S44), and the "Broadcast Counter" is initialized to zero (S45). The Broadcast Registration Table T2 is then sequentially searched from the top until the first user registered for processing is found (S46). If no user is registered (S47), the broadcast "Underway" mark is canceled (S65) and the procedure ends.

When a valid user entry is found in the Broadcast Registration Table T2 (S47), the Broadcast Registration Table entry for that user is canceled (S48), the current status of the user is copied from the User Information Data Table T1 and used as the broadcast status (S49), the Destination List Index is initialized to show the first entry in the Destination List (S50), and the current Destination List Number is read from the User Information Data Table T1 (S51). At this time, the Broadcast Counter value is compared with the Broadcast Counter Maximum (S52). If the Broadcast Counter value is less than the Broadcast Counter Maximum, the notification sending begins; otherwise, the suspension timer is activated (S58), and the procedure is suspended (S59).

When the suspension timer expires (S60), the Broadcast Procedure S3 recovers from the suspended state and determines if processing of the current entry should continue. First, the Broadcast Counter is reset to zero (S61). Next, the current user status is read from the User Information Data Table T1 and is compared with the currently used broadcast status (S62), which is the initial status value for the entry that was read in S49.

If there has been no change in user status, the Broadcast Registration Table T2 is checked to determine whether the entry was reregistered during the period of suspension (S63). If there has been a change in user status (S62), or if the entry has been reregistered (S63), processing of the current entry ends, the "Current User" variable is incremented to indicate the starting point of the next search (S64), and search of the Broadcast Registration Table T2 resumes beginning from the next user ID (S64).

If there has been no change in user status or reregister (S63) during a suspension, or after a check of the Broadcast Counter (S52), notification sending procedure begins, whereupon the current destination of the message is found in the Destination List (S53) by reading the destination determined by the Destination List Index and Destination List Number. After the destination is determined, the notification message of the change in user status is sent to the determined destination (S54). After sending the message, the Broadcast Counter is incremented by one (S55) and a check is made to determine if processing of all destinations on the Destination List T4 has been completed (S56). If unprocessed destinations remain on the Destination List T4, the Destination List Index is incremented to indicate the next destination (S57) and the Broadcast Counter value is compared with the Broadcast Counter Maximum (S52). If the Broadcast Counter value is less than the Broadcast Counter Maximum, notification sending resumes (S53); otherwise, the suspension timer is activated (S58) and the procedure is suspended (S59). If the processing of all destinations on the Destination List T4 has been completed, the "Current User" variable is incremented to indicate the starting point of the next search (S64), search of the Broadcast Registration Table T2 begins again (S46), and thereafter, processing is repeated in the same way.

Figure 5:
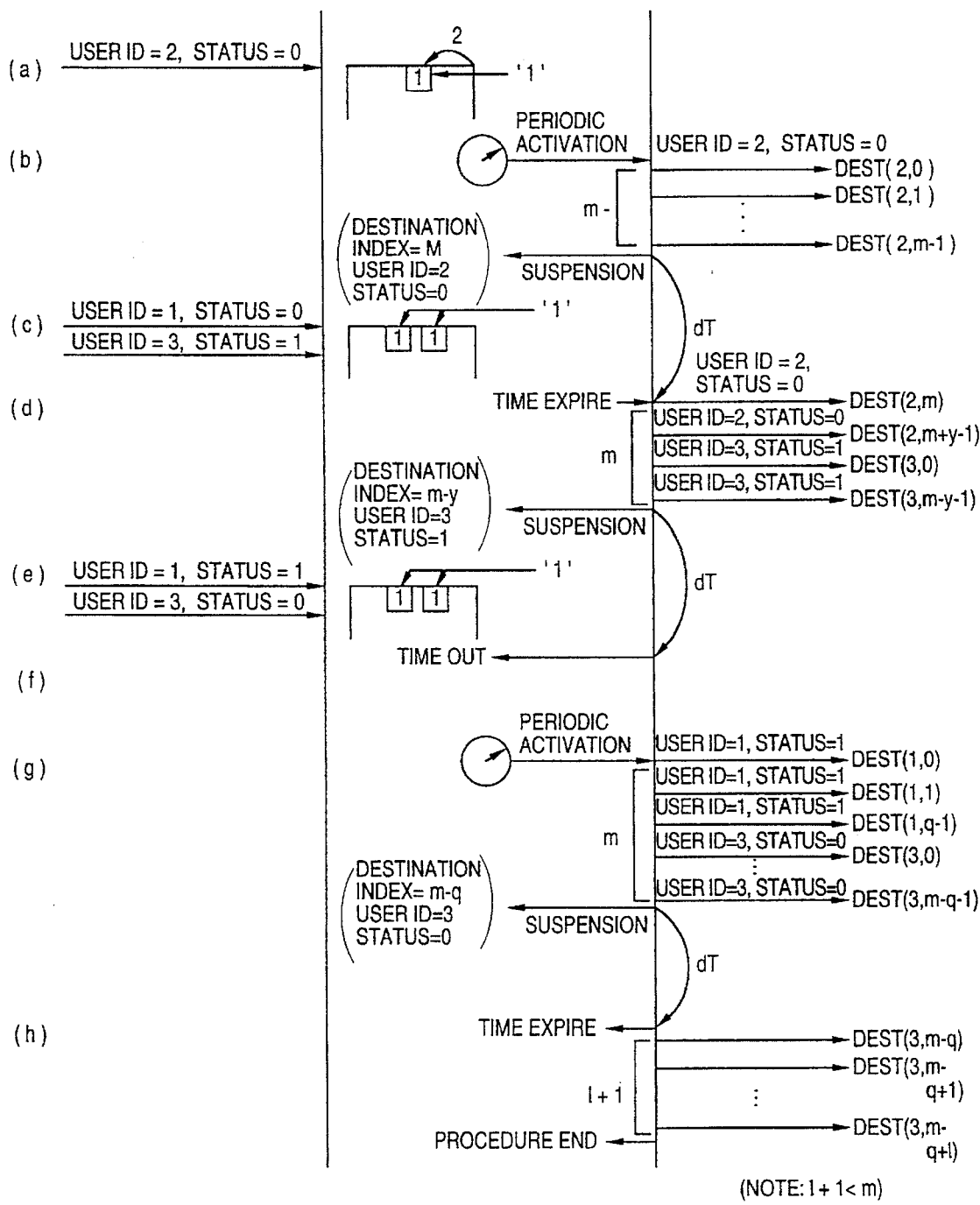
FIG. 5 shows a concrete example of the operation of the embodiment of FIG. 1 within a network.

The operation of the present invention within a network will next be explained using an embodiment with reference to FIG. 5. The present embodiment is represented by the portion between the two vertical lines of FIG. 5, with inputs being received from the left and notification messages being sent to concerned destinations to the right. The procedure progresses from the top of the figure towards the bottom, and starts with no users registered for broadcast. A value m is defined as the limit to the number of notification messages that can be sent within a time period dT.

At (a), notification is received that User 2 has changed to Status 0. Hereupon, by the registration procedure, the status entry in the User Information Data Table T1 is updated to 0 and User 2 is marked as registered in the Broadcast Registration Table T2.

At (b), the Broadcast Procedure S3 is activated at the user where change occurred. Since broadcast is not currently underway, the "Underway" mark is set, and User 2 is read from the Broadcast Registration Table T2. The "Current User" ID is 2, the "Current Status" is zero, and the registration of User 2 in the Broadcast Registration Table T2 is canceled. As shown on the right side of the figure, the maximum number of notifications possible within time period dT are sent to destinations on the Destination List T4 of User 2 beginning from the 0th destination and ending with the (m−1)th destination. After the notification that User 2 has changed to Status 0 has been sent to the (m−1)th destination DEST (2, m−1), the Broadcast Procedure S3 is suspended for the time period dT.

At (c), notification arrives during the time that the Broadcast Procedure S3 is suspended that User 1 has changed to Status 0 and User 3 has changed to Status 1. User information for these two users is updated and both users are registered to the Broadcast Registration Table T2.

At (d), the Broadcast Procedure S3 recovers from suspension and processing of User 2 resumes from the entry for destination DEST (2, m) in the Destination List T4 for User 2. When notification sending of the last destination DEST (2, m+y−1) in the Destination List T4 of User 2 is completed, processing begins for the next entry, User 3. Here, the "current Status" is updated to 1, "Current User" is updated to 3, "Current Entry" is updated to 0, and the registration mark for User 3 is canceled. Notification messages are then sent to each destination in the Destination List T4 of User 3 up to destination DEST (3, m−y−1). Upon completing this notification, the Index is set to m−y to indicate the next entry for User 3 and the Broadcast Procedure S3 is again suspended for the space of time period dT.

At (e), while the Broadcast Procedure S3 is suspended, notification is received that User 1 has changed to Status 1 and User 3 has changed to Status 0. Here, user information for both users is updated and User 3 is reregistered for broadcast.

At (f), the Broadcast Procedure S3 recovers from suspension, but processing of the current user, User 3, is stopped due to its update during the suspension. Since there is no entry in the Broadcast Registration Table T2 after User 3, the "Underway" mark is canceled and the Broadcast Procedure S3 ends.

At (g), the Broadcast Procedure S3 is activated by the system timing mechanism. Since the broadcast process is not underway at this time, the "Underway" mark is set and User 1 is read from the Broadcast Registration Table T2. Because the number q of concerned destinations associated with User 1 is less than the Broadcast Counter Maximum m, notification sending to all of the concerned destinations of User 1 is completed and processing of the second entry, User 3, is startedy. Processing of the Destination List T4 for User 3 continues until the (m−q−1)th entry, at which point the total number of notifications for User 1 and User 3 reaches m and consequently, the Broadcast Procedure S3 is again suspended. At this suspension, the "Current User" is 3, the "Current Status" is 0, and the "Destination List Index" is m−q. During processing, the registrations for both User 1 and User 3 have been canceled from the Broadcast Registration Table T2.

At (h), the Broadcast Procedure S3 recovers from suspension, notification sending begins for User 3, and notification is sent to the destinations remaining on the Destination List T4 for User 3. Because all of the user registrations have been canceled, the "Underway" mark for the Broadcast Procedure S3 is canceled, and, until activated again by the system timing mechanism, the procedure ends.

As described hereinabove, the present invention allows user status information to be sent to all concerned destinations, and by limiting the number of concerned destinations held by the user's Destination List T4 to either one or a few, the maintenance of the concerned destination database is simplified. In addition, by limiting the number of user status message notifications that can be sent during an arbitrarily fixed time period, the resources necessary for realizing broadcast of user status can be limited as desired, and by updating the database based on the latest user status information, only the latest information is supplied to the network.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A rate-limited user status broadcast method for use in a data communication network to which a plurality of users are connected, for broadcasting a change in a user's status to designated destinations associated with the user when a change occurs in the user's status, said data communication network having a broadcast registration table (T2) for indicating presence or absence of registration for broadcast processing for each user connected to the data communication network; a destination list (T4) for indicating a list of all concerned destinations for each user to be notified of a change in the user's status from a user originating a broadcast procedure (S3); a user information data table (T1) for indicating each user's current status and a destination list number of said destination list (T4) corresponding to that user; and a concerned destination list number table (T3) for listing addresses of the destination list (T4) corresponding to the destination list number; the broadcast method comprising the steps of:

upon receiving notification of a change in a user's status, activating a broadcast registration procedure (S1) to update the user's status in the user information data table (T1), registering the user in the broadcast registration table (T2) as a subject for a broadcast procedure (S3) if the user's concerned destination list number is designated, activating periodically the broadcast procedure (S3) to check the broadcast registration table (T2) sequentially from a top position, when a valid registered user entry is found, performing the following steps:

i. cancelling the registered user entry and reading the user's status;

ii. using the read user's status as the user's current status and reading the destination list number from the user information data table;

iii. sending notification messages of the change in the user's status using the read user's status to all concerned destination users listed in the destination list (T4) corresponding to the read destination list number as long as the number of broadcast messages sent to other users is within a given maximum number; and iv. suspending sending notification messages when the number of broadcast messages exceeds the said given maximum number;

wherein after passage of a fixed suspension period, if no change is entered in the user's current status and if no new registration has been entered, resuming the sending of notification messages; or wherein after passage of the fixed suspension period, if a change in the user's current status has occurred, or if a new entry has been registered in the broadcast registration table, processing of the user is stopped and the broadcast Procedure (S3) is carried out for a next valid user registered in the broadcast registration table (T2); and wherein the broadcast procedure (S3) is ended when the broadcast is completed to all concerned destinations of valid users.

2. A rate-limited user status broadcast method according to claim 1 wherein a Destination List is set to limit the number of destinations on each user's destination list which must be notified of a user's status.

3. A rate-limited user status broadcast method according to claim 1 wherein a Destination List is set for each user, or one Destination List may be applied to a plurality of users.

4. A rate-limited user status broadcast method according to claims 1 wherein, in the Broadcast Procedure, a user is registered as a subject for broadcast only when the user's status changed.

5. A rate-limited user status broadcast method according to claims 1 wherein after broadcast registration, only the last user's status at the time broadcast processing begins is reported to a concerned destination even if the user's status has changed more than once during the time before execution of broadcast.

* * * * *